United States Patent
Fan et al.

(10) Patent No.: US 9,875,203 B2
(45) Date of Patent: Jan. 23, 2018

(54) INTELLIGENT CONNECTOR

(71) Applicant: Tyco Electronics (Shanghai) Co. Ltd., Shanghai (CN)

(72) Inventors: Mingjie Fan, Shanghai (CN); Feng Dai, Shanghai (CN); Yulin Feng, Shanghai (CN); Yuming Song, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 234 days.

(21) Appl. No.: 14/704,520

(22) Filed: May 5, 2015

(65) Prior Publication Data

US 2015/0309955 A1    Oct. 29, 2015

Related U.S. Application Data

(63) Continuation of application No. PCT/IB2013/059820, filed on Oct. 31, 2013.

(30) Foreign Application Priority Data

Nov. 5, 2012 (CN) .......................... 2012 1 04369957

(51) Int. Cl.
*G06F 13/36* (2006.01)
*G06F 13/40* (2006.01)
*H04L 12/403* (2006.01)
*G06F 1/26* (2006.01)
*G06F 13/364* (2006.01)

(52) U.S. Cl.
CPC ............ *G06F 13/4022* (2013.01); *G06F 1/26* (2013.01); *G06F 13/364* (2013.01); *G06F 13/4045* (2013.01); *H04L 12/403* (2013.01)

(58) Field of Classification Search
None
See application file for complete search history.

(56) References Cited

U.S. PATENT DOCUMENTS

| | | | |
|---|---|---|---|
| 4,682,168 A | 7/1987 | Chang et al. | |
| 5,637,933 A * | 6/1997 | Rawlings | H02J 13/0062 307/147 |
| 6,472,770 B1 * | 10/2002 | Pohjola | B60R 16/0315 307/10.1 |
| 6,963,146 B2 * | 11/2005 | Zecca | B60R 16/0315 307/10.1 |
| 7,598,631 B2 * | 10/2009 | Szabados | H01H 47/22 307/140 |
| 2005/0273211 A1 * | 12/2005 | McGarry | G08C 17/02 701/1 |

(Continued)

FOREIGN PATENT DOCUMENTS

EP    1357645 A1    10/2003

OTHER PUBLICATIONS

Abstract of EP1357645, dated Oct. 29, 2003, 1 page.

(Continued)

Primary Examiner — Elias Mamo
(74) Attorney, Agent, or Firm — Barley Snyder

(57) ABSTRACT

An intelligent connector is provided and includes a bus control module. The a bus control module includes a bus interface, a load interface, a first switch control interface configured to output a switch control signal, and a signal processing unit configured to process a interchanged signal.

23 Claims, 6 Drawing Sheets

(56) References Cited

U.S. PATENT DOCUMENTS

2006/0224776 A1* 10/2006 Vanderhenst ..... H04L 12/40032
710/1
2007/0255879 A1* 11/2007 Sagues ............... G05B 19/0423
710/301
2012/0039217 A1 2/2012 Halsall
2012/0198408 A1* 8/2012 Chopra ................ G06F 17/504
716/127

OTHER PUBLICATIONS

PCT International Search Report, International Application No. PCT/IB2013/059820, dated Apr. 30, 2015, 5 pages.
PCT Written Opinion of the International Searching Authority, International Application No. PCT/IB2013/059820, dated Apr. 30, 2015, 6 pages.

* cited by examiner

INTELLIGENT CONNECTOR

CROSS-REFERENCE TO RELATED APPLICATIONS

This application is a continuation of PCT International Application No.: PCT/IB2013/059820, filed Oct. 31, 2013, which claims priority under 35 U.S.C. § 119 to Chinese Application No.: 2012104369957, filed Nov. 5, 2012.

FIELD OF THE INVENTION

The invention relates to a connector and, more particularly, to an intelligent connector for coupling a slave module in an electric appliance to a bus.

BACKGROUND

Along with the development of electronic technologies, more and more electric appliances have various hardware modules integrated therein to perform different physical functions. For example, these hardware modules include an electric heater, a fan, a motor, numerous sensors, etc. In order to control operation of these hardware modules, a traditional master control board of the electric appliance has to be connected respectively to the respective hardware modules to provide them with power supply or signal exchange. Moreover, switches or relays for controlling power supply to the hardware modules are also typically integrated on the master control board.

However, this known direct-connection control mode has increasingly become a bottleneck of a system design as new devices and functions are constantly being introduced. It will have the master control board populated with a larger number of devices and consequently of a larger size and lowered flexibility and at a higher maintenance cost. In view of this, another control mode has been developed to control a master control board with controlled components via a bus in an attempt to take place of the traditional direct-connection control mode. This bus-type control architecture requires each node coupled on the bus to have some data processing power. Nevertheless numerous traditional hardware modules, e.g., a heating pipe, an electrical machine, a valve, etc., have no data processing function as such and consequently have to be connected thereon with an intelligent control module. Unfortunately, it may be rather difficult to devise a versatile intelligent connector installable on different hardware modules due to the diversity of hardware modules as well as their structural and size differences.

SUMMARY

In view of the above, it is desirable to provide an intelligent connector facilitating coupling of a variety of hardware modules onto a bus. The intelligent connector includes a bus control module. The a bus control module includes a bus interface, a load interface, a first switch control interface configured to output a switch control signal, and a signal processing unit configured to process a interchanged signal.

BRIEF DESCRIPTION OF THE DRAWINGS

In the following, embodiments shown in connection with the drawings will be described in details, and the forgoing and other features of the invention will become more apparent; and identical or similar components will be denoted with identical or similar reference numerals throughout the drawings, in which.

DETAILED DESCRIPTION OF THE EMBODIMENT(S)

In the following detailed description of exemplary embodiments, reference will be made to the drawings which constitute a part of the invention. By way of examples, the drawings illustrate particular embodiments in which the invention can be practiced. The shown embodiments are not intended to exhaust all of embodiments of the invention. It can be appreciated that other embodiments can be utilized instead thereof or structural and logic modifications can be made thereto without departing from the scope of the invention. Accordingly, the following detailed description will not be limiting, and the scope of the invention will be defined in the appended claims.

Figure 1:
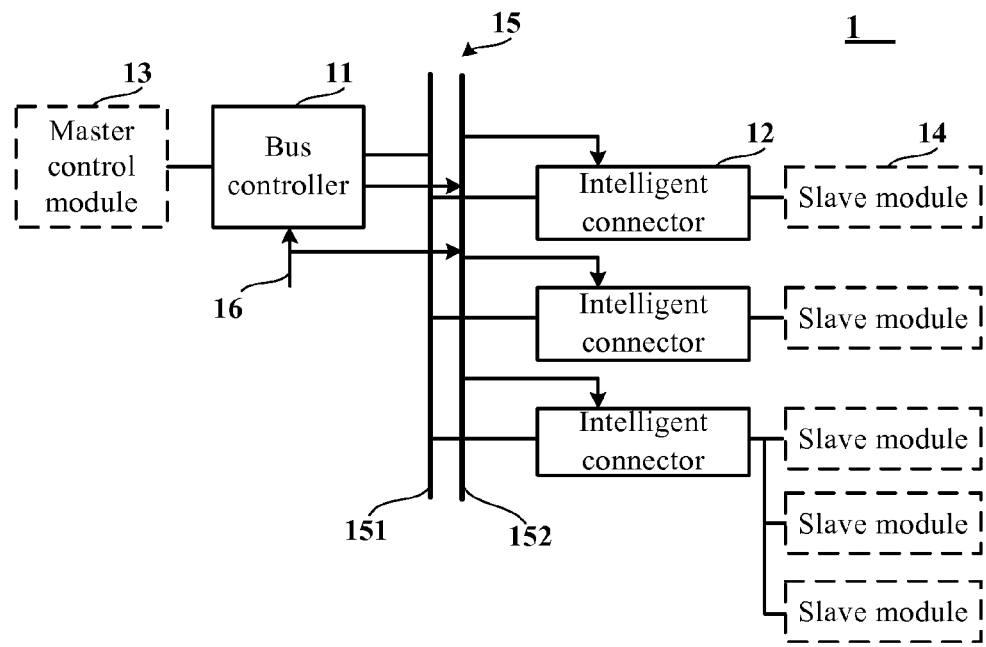
FIG. 1 is a circuit block diagram of a control line in which an intelligent connector according to the invention can be embodied.

With reference to FIG. 1, a control line 100 is shown in which an intelligent connector according to an embodiment of the invention can be embodied. The control line 100 is arranged in an electric appliance (not shown) in order to couple a master control module 130 in the electric appliance to at least one slave module 140 for the purpose of signal exchange between the master control module 130 and the slave module 140.

In some examples, the electric appliance is, for example, a home electric appliance, an industrially controlled device, a digitally controlled machine tool, etc. Particularly, the master control module 130 refers to a module for controlling operation of the slave module 140 in the electric appliance. The master control module 130 can generate a control signal, for controlling operation of the slave module 140, from an instruction input from a user or generated by an operating application and is, for example, a micro-control unit, a micro-controller or another appropriate electronic device. The slave module 140 refers to an electronic or electromechanical module coupled to the master control module 130 through the control line 100. In some examples, operation of the slave module 140 is controlled by a control signal provided from the master control module 130 and is, for example, a heater, a heat sink, an executor, etc.; and in some other examples, the slave module 140 can further generate a feedback signal and is, for example, a sensor, etc. Generally, the slave module 140 can have its operation kept by power supply loaded thereon and its operating state changed by varying power supply (for example, varying supply power, current or voltage).

It shall be noted that the number of slave modules 140 shown in FIG. 1 is merely illustrative, and those ordinarily skilled in the art shall appreciate that in a practical application, the number of slave modules 140 included in the electric appliance will not be limited to three but can be one, two or more than three. Moreover in a practical application, one intelligent connector 120 can also correspond to two or more slave modules 140.

As shown in FIG. 1, the control line 100 is structured with a bus which is a bus 150 coupling the intelligent connectors 120 with a bus controller 110, where the bus 150 is configured to transmit a data signal, for example, a control signal from the master control module 130 can be transmitted to an intelligent connector 120 via the bus 150 and further provided by the intelligent connector 120 to a corresponding slave module 140; or a feedback signal from a slave module 140 can be transmitted to the bus controller 110 via the bus 150 and further provided by the bus controller 110 to the master control module 130.

Figure 2:
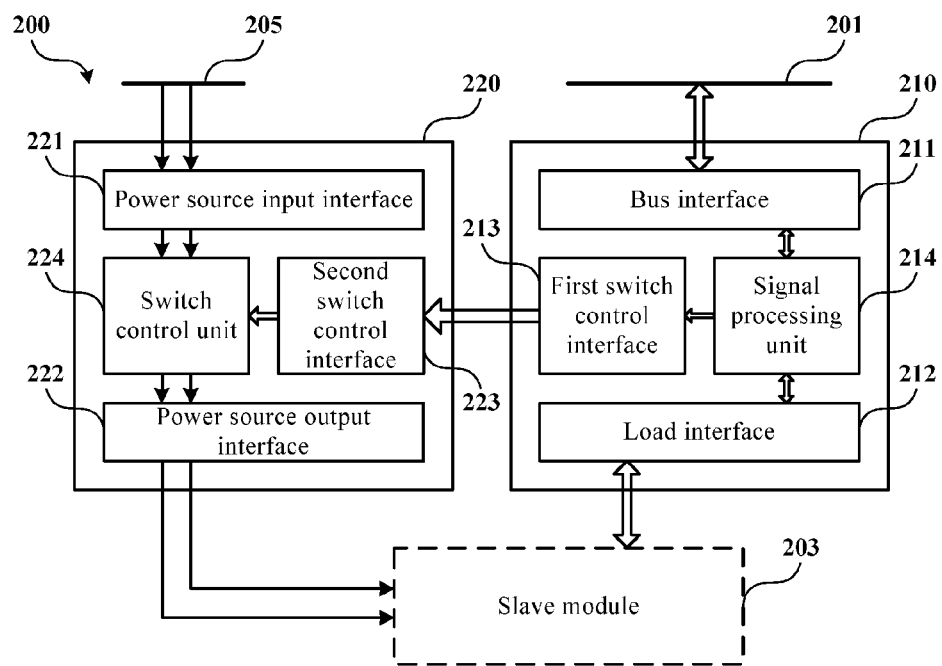
FIG. 2 is a circuit block diagram of an intelligent connector according to the invention.

In an embodiment of the invention, an intelligent connector 120 is further coupled onto a power supply line 160 to receive a power supply provided by the power supply line 160 (for example, power supply from a power source) and to provide a slave module 140 with the power supply. In the shown embodiment of FIG. 1, the power supply line 160 is introduced to an intelligent connector 120 via the bus 150, that is, the bus 150 includes a signal bus 151 for transmitting a signal and a power bus 152 for relaying power supply. The power bus 152 can be provided with power supply by being coupled indirectly to the power supply line 160 through the bus controller 110 and also can be provided with power supply by being coupled directly to the power supply line 160 on the electric appliance. In a practical application, the power bus 152 and the power supply line 160 can be connected in either of these two coupling modes or in both of these two coupling modes as shown in FIG. 2. Alternatively, in some other embodiments, the power supply line 160 can be connected directly to an intelligent connector 120 without the bus 150 and provide a corresponding slave module 140 with power supply through the intelligent connector 120.

Figure 3:
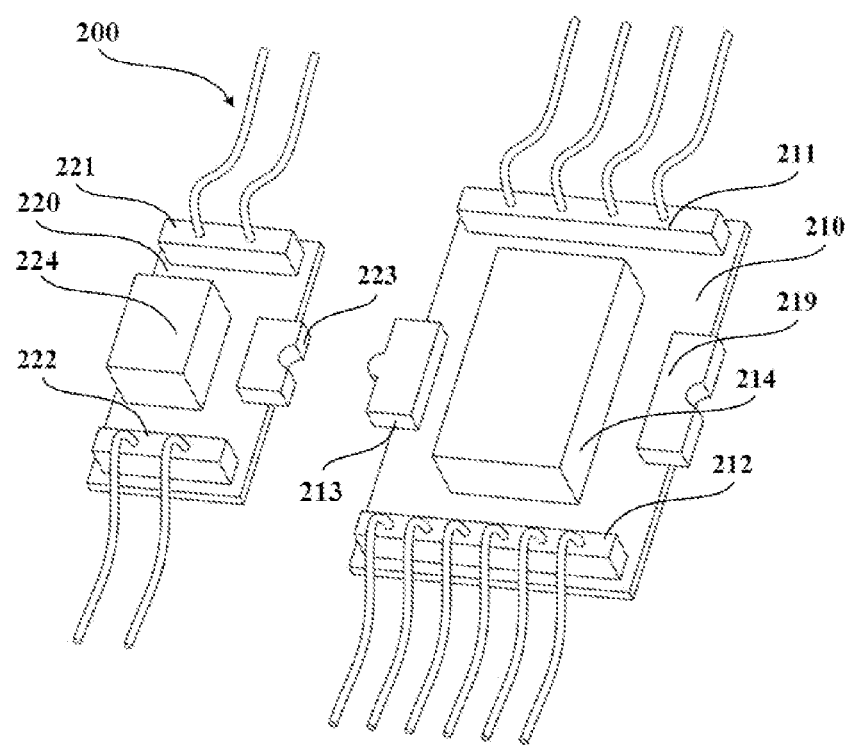
FIG. 3 is a perspective view of the intelligent connector of FIG. 2.

With reference to FIG. 2 and FIG. 3, an intelligent connector 200 according to the invention will be described.

As shown in FIG. 2 and FIG. 3, the intelligent connector 200 is configured to couple a bus 201 in an electric appliance with at least one slave module 203 (not shown). Particularly, the intelligent connector 200 includes a bus control module 210 having a bus interface 211, a load interface 212, a first switch control interface 213 and a signal processing unit 214. The bus control module 210 is coupled to the bus 201 via the bus interface 211 and coupled to the slave module 203 via the load interface 212 to interchange signals between the bus 201 and the slave module 203. The signal processing unit 214 is configured to process the interchanged signal. The first switch control interface 213 is configured to output a switch control signal.

The bus control module 210 can be separate from a power source control module controlling power supply to the slave module 203, which can alleviate installation problems arising from size, shape and electrical specification restrictions of the slave module 203. Thus different slave (hardware) modules 203 can be used with the versatile bus control module 210, so that the latter can have the function of processing data integrated with the function of directing power supply to controllably coupled the slave (hardware) modules 203 onto the bus 201.

The intelligent connector 200 directly controls the power supply to the slave module 203 by providing the power source control module with a switch control signal. The intelligent connector 200 can further have the function of directly controlling power supply to the slave module 203.

Thus, optionally in some examples, the intelligent connector 200 further include a power source control module 220 having a power source input interface 221, a power source output interface 222, a second switch control interface 223 and a switch control unit 224. The power source control module 220 receives power supply via the power source input interface 221 and provides the slave module 203 with power supply via the power source output interface 222. The second switch control interface 223 is detachably coupled to the first switch control interface 213 to receive the switch control signal provided by the bus control module 210 and to provide the slave module 203 with power supply in response to the switch control signal.

Particularly, the intelligent connectors 200 coupled on the bus 201 is provided with different addresses, so that the different intelligent connectors 200 can be distinguished from each other and identified by a bus controller or a master control board (not shown) coupled on the bus 201. The bus controller sends a control signal provided by the master control board into a data packet and adds a destination address thereto, when the master control board controls a slave module coupled with an intelligent connector 200 through the bus controller. Thereafter, the bus controller transmits the packed control signal to the bus 201 via which the control signal is further distributed to the respective intelligent connectors 200. Next, the intelligent connectors 200 receive the data packet transmitted via the bus 201 at their bus interfaces 211 and then have the data package parsed by the signal processing units 214 to obtain the control signal therein. If the destination address does not match the address of an intelligent connector 200 itself, then the intelligent connector 200 discards the data packet. In the alternative, if the destination address matches, then the signal processing unit 214 further responds to the obtained control signal and acts in accordance to different control instructions included therein.

For example, the intelligent connector 200 receives a control signal instructing power supply to the slave module 203 to be enabled, disabled or adjusted, and then the intelligent connector 200 transmits the power source control signal regarding power supply to the switch control unit 224 of the power source control unit 220 through the first switch control interface 213, as well as the second switch control interface 223 of the power source control unit 220, and the switch control unit 224 further controls the power supply. In another example, the intelligent connector 200 receives a control signal instructing the slave module 203 to be controlled, for example, control instructions to instruct the slave module 203 to acquire data, test a signal, set a parameter or perform another function, and then the intelligent connector 200 transmits the control instructions or other data information resulting from parsing to the slave module 203 through the load interface 212. In yet another example, the intelligent connector 200 can further receive a feedback signal from the slave module 203 via the load interface 212 (for example, sense data and state information of the slave module or other signal or data fed back from the slave module 203) and have the feedback signal processed by the signal processing unit 214 and then further transmitted to the bus 201 via the bus interface 211.

In the power source control module 220, the switch control module 224 is coupled respectively to the power source input interface 221, the power source output interface 222 and the second switch control interface 223. As such the switch control module 224 can control power supply received via the power source input interface 221 to be output to the slave module 203 via the power source output interface 222 in response to the source power control signal received via the second switch control interface 223. In some examples, the switch control module 224 is, for example, a relay, a thyristor or another device capable of adjusting power supply (for example, current, voltage or an ON/OFF state).

In an embodiment of the invention, the bus control module 210 further includes a debug interface 219 coupled to the signal processing unit 214. The bus control module 210 can download a debug program, receive a debug instruction and output state information via the debug interface 219.

In the shown embodiment of FIGS. 2 and 3, the bus control module 210 and the power source control module 220 are arranged on different printed circuit boards, so that these two modules can be fabricated respectively in response to different application demands. When the intelligent connector 200 is installed and used, the respective interfaces in these two modules (except the first switch control interface 213 and the second switch control interface 223) can be connected respectively onto pins of the bus 201 or the slave module 203 to thereby have the bus coupled with the slave module 203. For example, as shown in FIG. 3, the bus interface 211 includes a plurality of pins, each of which is electrically connected onto the bus 201 respectively through a conductive wire; and the load interface 212 includes a plurality of pins, each of which is electrically connected onto a corresponding signal pin of the slave module 203 respectively through a conductive wire. Optionally, the bus interface 211 can be of a type of single-wire bus interface, for example, LIN (Local Interconnect Network) bus interface, and transmit a signal under a corresponding bus protocol specification. The interface embodied in the type of single-wire bus interface is provided with a small number of pins and thus structurally simple. In some examples, the bus interface 211 is provided with at least one voltage input pin, for example, a 5V and/or 12V voltage input pin, a ground pin and a data pin. Moreover, the load interface 212 includes one or more pins for inputting a frequency signal, inputting a voltage analog signal, outputting PWM (Pulse Width Modulation) signal, inputting a switch signal or outputting a controllable power source respectively.

For example, the frequency signal input pin can input a digital clock signal at a Transistor-Transistor Logic (TTL) level (0-5V) at a frequency ranging from 10 kHz to 100 kHz or in another frequency range, and this pin is primarily used for a water level sensor, a humidity sensor, a Hall rotation speed sensor or another signal output at a frequency varying with a measurement value. The voltage analog signal input pin can input, for example, an analog signal at 0-5V and is primarily used for a temperature sensor, a turbidity sensor or another signal output at a voltage varying with a measurement value. The PWM output pin can output a PWM digital signal or a filtered analog signal output (0-5V) and is used for controlling the rotation speed of an electrical machine, regulating the brightness of a lamp, etc. The switch signal input pin can input a high/low level trigger and is used for detection with a switch, detection with a Hall switch, etc. The controllable power source output pin can be used to drive a direct-current powered appliance and perform detection with live current to thereby have output power of the pin monitored.

In the power source control module 220, the power source input interface 221 is provided with two pins, each of which is electrically connected onto the power supply line 205 respectively through a conductive wire; and the power source output interface 222 is provided with two pins, each of which is electrically connected to a power input pin of the slave module 203 respectively through a conductive wire.

The first switch control interface 213 of the bus control module 210 and the second switch control interface 223 of the power source control module 220 are arranged respectively at two terminals of the different printed circuit boards. These two terminals match each other, that is, they correspond to each other in shape and structure, so that the first switch control interface 213 and the second switch control interface 223 can be detachably coupled through these two terminals. In the example shown in FIG. 3, the first switch control interface 213 and the second switch control interface 223 for detachably coupling the bus control module 210 and the power source control module 220 to transport a power source control signal are shaped as structurally matching terminals, that is they are keyed. For example, in the shown embodiment, the first switch control interface 213 is shaped as a semicircular projection with a plurality of pins extending out therefrom; and correspondingly, and the second switch control interface 223 is shaped as a semicircular recess on the inside of or inside which there are a plurality of pins extending out. As such, the first switch control interface 213 can be inserted into the recess portion of the second switch control interface 223 to have the corresponding pins on these two modules come into contact with each other for electrical connection. As can be appreciated, the structures and shapes of the interfaces in FIG. 3 are merely illustrative, and in a practical application, the respective terminals can alternatively be embodied in other structures dependent upon different structures or shapes of the slave modules 203. Moreover, it shall be further noted that the respective terminals in FIG. 3 can be decomposed respectively into a plurality of slave sub-terminals or a plurality of different terminals can be integrated with each other into a single terminal.

Since the bus control module 210 and the power source control module 220 of the intelligent connector 200 are coupled with each other via the two detachably coupled interfaces, a variety of slave modules 203 can be loaded with power source control modules 220 adapted to their structural and power source control requirements, and these power source control modules 220 can be embodied in different structures, sizes and electrical specifications. Thus, the intelligent connector 200 can satisfy the structural and power source control requirements of the different slave modules 203 while lowering a cost of implementing the bus control architecture.

It still shall be noted that the intelligent connector 200 shown in FIG. 2 and FIG. 3 above includes both the bus control module 210 and the power source control module 220. However, in another embodiment, the intelligent connector 200 may include only the bus control module 210, while the power source control module 220 may be provided additionally and detachably coupled on the bus control module 210.

Now with reference to FIG. 4 and FIG. 5, another intelligent connector 300 according to the invention will be described.

As shown, the intelligent connector 300 is configured to couple a bus 301 in an electric appliance with at least one slave module 303 (not shown). Particularly the intelligent connector 300 includes:

A bus control module 310 includes a bus interface 311, a load interface 312, a first switch control interface 313, a signal processing unit 314, a first power source input interface 315 and a first power source output interface 316. The bus control module 310 is coupled to the bus 301 via the bus interface 311 and coupled to the slave module 303 via the load interface 312 to interchange signals between the bus 301 and the slave module 303. The signal processing unit 314 is configured to process the interchanged signal; and the first switch control interface 313 is configured to output a switch control signal. Moreover the first power source input interface 315 is configured to be coupled with a power supply line 305 to receive a power supply.

A power source control module 320 includes a power source input interface 321, a power source output interface 322, a second switch control interface 323 and a switch control unit 324, where the power source control module 320 is detachably coupled with the first power source output interface 316 via the power source input interface 321 to receive a power supply output via the first power source output interface 316 and to provide the slave module 303 with power supply via the power source output interface 322; and the second switch control interface 323 is detachably coupled to the first switch control interface 313 to receive a switch control signal provided by the bus control module 310 and to control the slave module 303 to be provided with power supply in response to the switch control signal.

As can be apparent, for the intelligent connector 300, the interface via which it obtains power supply, i.e., the first power source input interface 315, can be integrated on the bus control module 310, which in turn provides the power source control module 320 with power supply. This connector structure is suitable in an application scenario where the power supply line 305 and the bus 301 are integrated together to thereby lower the number of separate terminals. That is, the first power source input interface 315 can be integrated with the bus interface 311 into the same terminal 331 to thereby be coupled with the bus 301 and the power supply line 305 through the same bundle of wires (including a plurality of conductive wires).

In the shown embodiment, the power source control module 320 further includes a first signal interface 325 and a second signal interface 326, where the first signal interface 325 is configured to be coupled with the load interface 312, and the second signal interface 326 is configured to be coupled with the slave module 303, and the first signal interface 325 and the second signal interface 326 are coupled with each other. As such, the power source control module 320 can be integrated with the second signal interface 326 into the same terminal 334 to thereby be coupled with the slave module 303 through the same bundle of wires (including a plurality of conductive wires). Also, the power source input interface 321, the second switch control interface 323 and the first signal interface 325 can be integrated into the same terminal 333. Correspondingly, the first power source output interface 316, the first switch control interface 313 and the load interface 312 can be integrated into a terminal 332 matching the forgoing terminal. As such these two terminals 331 and 332 cooperate with each other to have corresponding pins on these two modules come into contact for electrical connection. As such, the power source control module 320 can be used in cooperation with the bus control module 310 in a series form, which can improve the structural performance, particularly structural stability and reliability, of the intelligent connector 300. For example, a strand of wires is insusceptible to the problem of infirm connection occurring between the interfaces due to stress imbalance.

Figure 4:
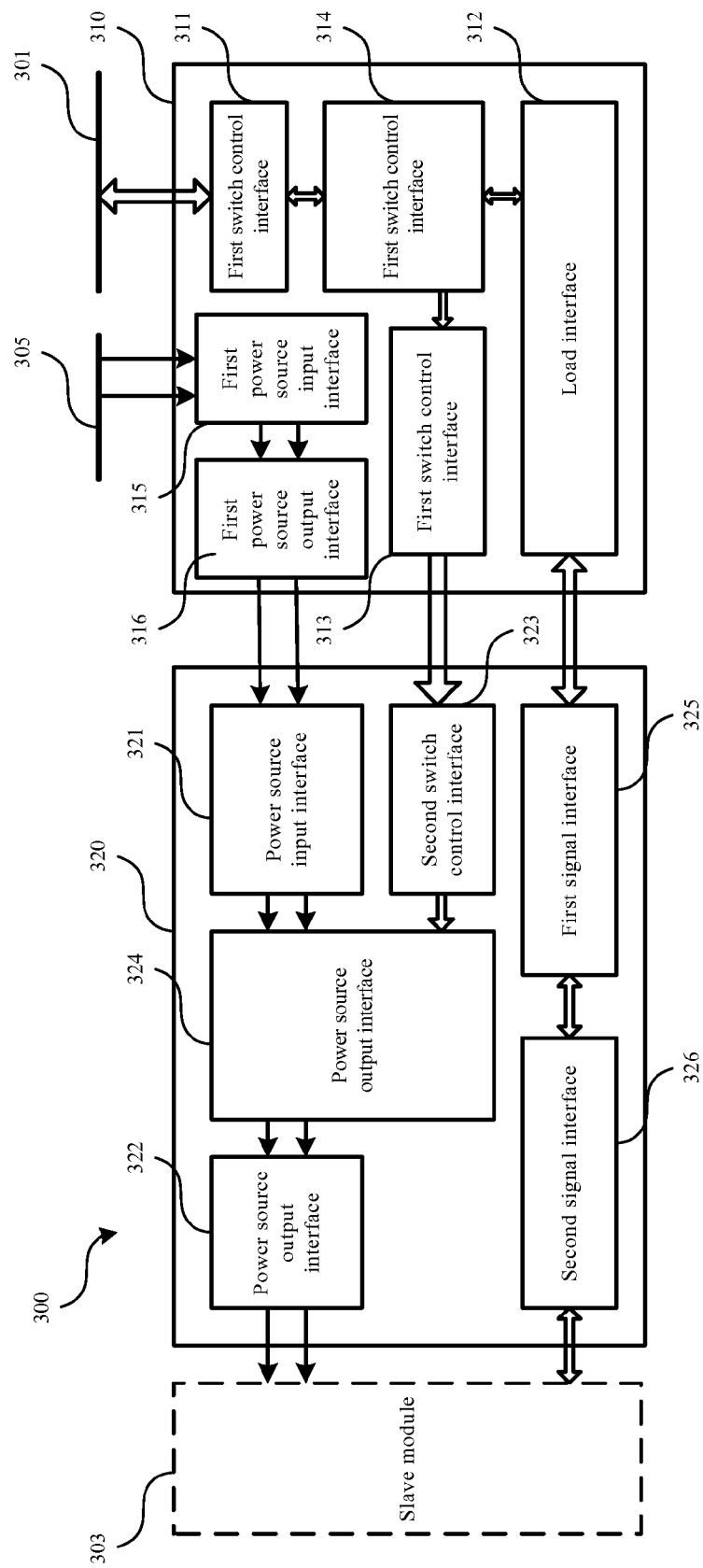
FIG. 4 is a circuit block diagram of another intelligent connector according to the invention.
Figure 5:
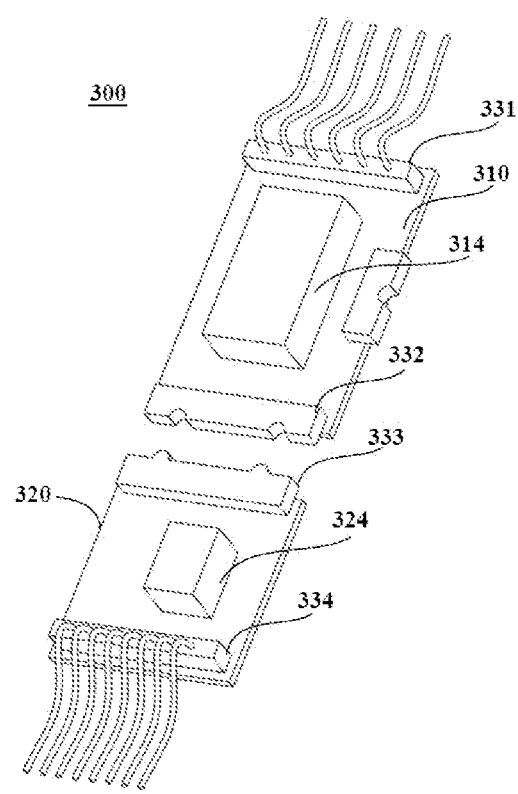
FIG. 5 is a perspective view of the intelligent connector of FIG. 4.

It still shall be noted that the intelligent connector 300 shown in FIG. 4 and FIG. 5 above includes both the bus control module 310 and the power source control module 320. However in another embodiment, the intelligent connector 300 may include only the bus control module 310, while the power source control module 320 may be provided additionally and detachably coupled on the bus control module 310.

Now with reference to FIG. 6 and FIG. 7, another intelligent connector 400 according to the invention will be described.

Figure 6:
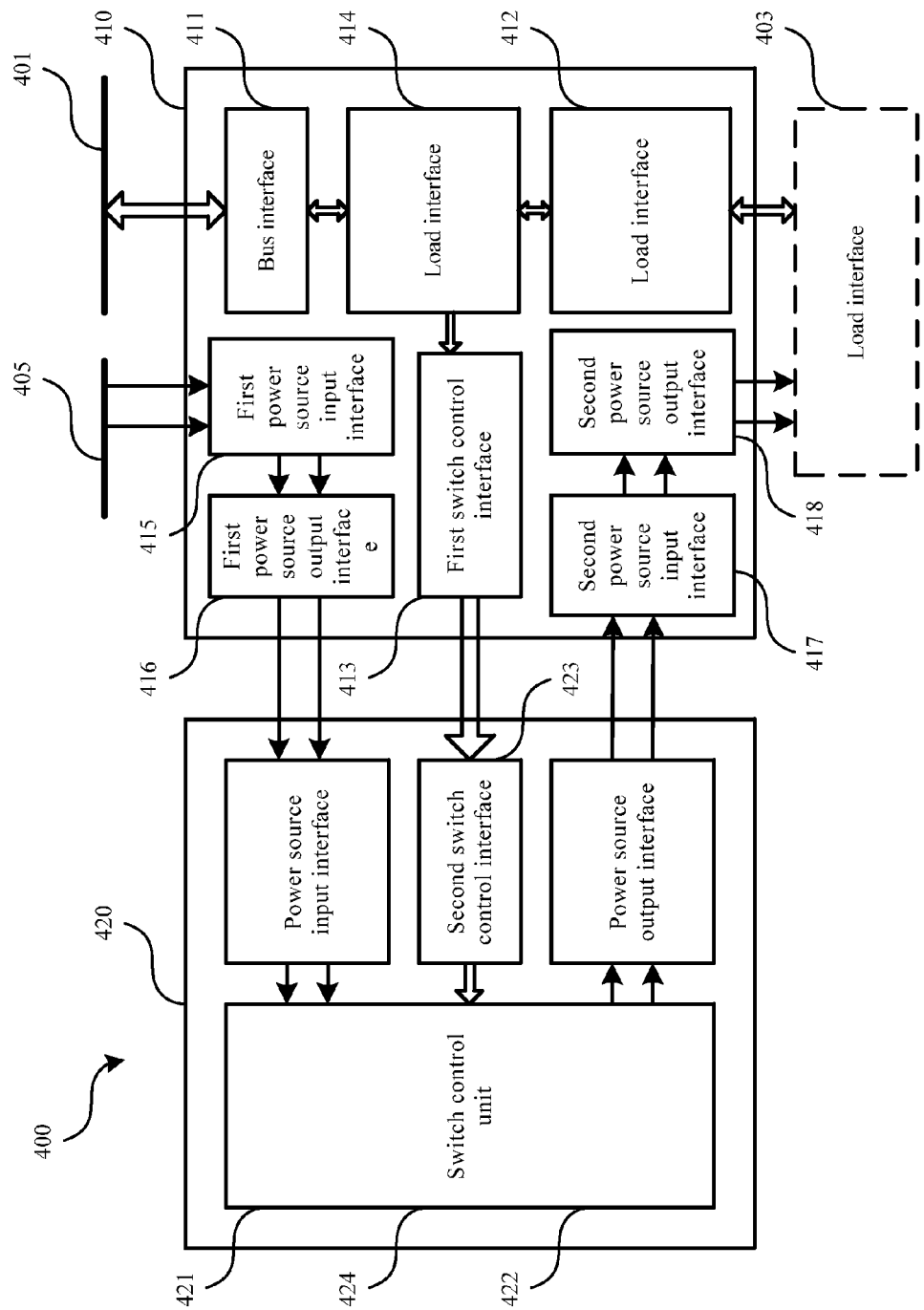
FIG. 6 is a circuit block diagram of another intelligent connector according to the invention.
Figure 7:
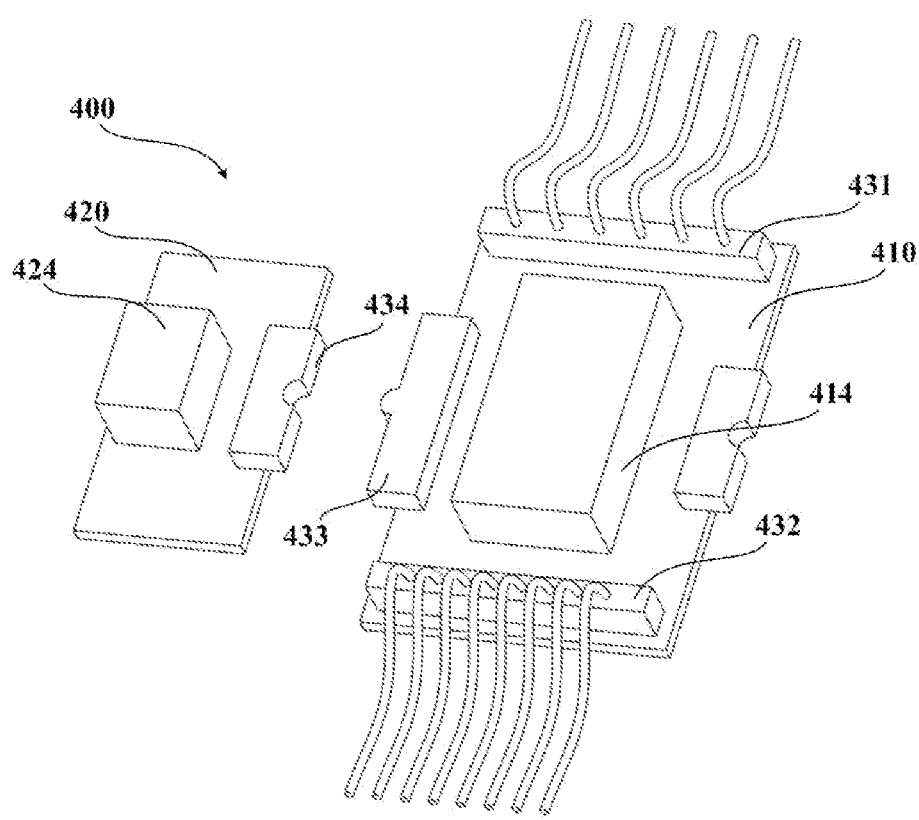
FIG. 7 is a perspective view of the intelligent connector of FIG. 6.

As shown in FIG. 6 and FIG. 7, the intelligent connector 400 is configured to couple a bus 401 in an electric appliance with at least one slave module 403 (not shown). Particularly the intelligent connector 400 includes a bus control module 410 having a bus interface 411, a load interface 412, a first switch control interface 413 and a signal processing unit 414. The bus control module 410 is coupled to the bus 401 via the bus interface 411 and coupled to the slave module 403 via the load interface 412 to interchange signals between the bus 401 and the slave module 403. The signal processing unit 414 is configured to process the interchanged signal; and the first switch control interface 413 is configured to output a switch control signal.

A power source control module 420 includes a power source input interface 421, a power source output interface 422, a second switch control interface 423 and a switch control unit 424. The power source control module 420 is detachably coupled with the first power source output interface 416 via the power source input interface 421 to receive a power supply output via the first power source output interface 416 and to provide the slave module 403 with power supply via the power source output interface 422.

Moreover, the bus control module 410 further includes a first power source input interface 415, a first power source output interface 416, a second power source input interface 417 and a second power source output interface 418. Particularly, the first power source input interface 415 is configured to be coupled with a power supply line 405 to receive a power supply. The first power source output interface 416 is configured to be detachably coupled with the power source input interface 421 of the power source control module 420 to output power supply received from the first power source input interface 415. Moreover, the second power source input interface 417 is configured to be coupled with the power source output interface 422 of the power source control module 420 to receive a power supply; and the second power source output interface 418 is configured to be coupled with the slave module 403 to provide power supply thereto.

In the structure of the intelligent connector 400 shown in FIG. 7, the bus interface 411 is integrated with the first power source input interface 415 into the same terminal 431 to be together coupled with the bus 401 and the power supply line 405. The second power source output interface 418 is integrated with the load interface 412 into the same terminal 432 to be together connected with power source and signal interfaces of the slave module 403. Moreover, the first power source output interface 416, the second power source input interface 417 and the first switch control interface 413 are integrated into the same terminal 433. The power source input interface 421, the power source output interface 422 and the second switch control interface 423 are integrated into a terminal 434 matching in shape with the terminal 433 to thereby have the bus control module 410 and the power source control module 420 coupled detachably.

As such, it is not necessary for the power source control module 420 to be coupled with the bus 401 and the slave module 403, which also facilitates a lowered number of terminals and consequently a lowered cost and a simplified structure.

It still shall be noted that the intelligent connector 400 shown in FIG. 6 and FIG. 7 above includes both the bus control module 410 and the power source control module 420. However, in another embodiment, the intelligent connector 400 may include only the bus control module 410, while the power source control module 420 may be provided additionally and detachably coupled on the bus control module 410.

Although the invention has been shown and described in details in the drawings and the foregoing description, it shall be appreciated that the illustration and the description are exemplary and illustrative but not limiting; and the invention will not be limited to the foregoing embodiments.

Those ordinarily skilled in the art can appreciate and make other variants to the disclosed embodiments upon study of the description, the disclosure, the drawings and the claims. In the claims, the term "comprise" will not preclude another element or step, and the term "a/an" will not prelude plural. In a practical application of the invention, an element may perform functions of a plurality of technical features recited in a claim. Any reference numerals in the claims shall not be construed to be limiting of the scope of the invention.

What is claimed is:

1. An intelligent connector, comprising:
   a bus control module having:
      a bus interface;
      a load interface;
      a first switch control interface configured to output a switch control signal; and
      a signal processing unit configured to process a interchanged signal; and
   a power source control module connected with the bus control module and receiving the switch control signal from the bus control module, the power source control module including a second switch control interface detachably coupled with the first switch control interface to receive the switch control signal.

2. The intelligent connector according to claim 1, wherein the power source control module includes a power source input interface.

3. The intelligent connector according to claim 2, wherein the power source control module further includes a power source output interface.

4. The intelligent connector according to claim 3, wherein the power source control module further includes a switch control unit.

5. The intelligent connector according to claim 4, wherein the switch control unit includes a relay or a thyristor.

6. The intelligent connector according to claim 1, wherein the bus control module and the power source control module are arranged on different printed circuit boards.

7. The intelligent connector according to claim 6, wherein the first switch control interface and the second switch control interface are arranged respectively at two terminals of the different printed circuit boards.

8. The intelligent connector according to claim 1, wherein the first switch control interface and the second switch control interface are correspondingly keyed to each other.

9. The intelligent connector according to claim 1, wherein the power source control module further includes a first signal interface corresponding with the load interface.

10. The intelligent connector according to claim 9, wherein the power source control module further includes a second signal interface is configured to be coupled with a slave module.

11. The intelligent connector according to claim 3, wherein the bus control module further includes a first power source input interface corresponding with a power supply line to receive a power supply.

12. The intelligent connector according to claim 11, wherein the bus control module further includes a first power source output interface detachably coupled with the power source input interface to output the power supply received from the first power source input interface.

13. The intelligent connector according to claim 12, wherein the bus control module further includes a second power source input interface connected with the power source output interface to receive the power supply.

14. The intelligent connector according to claim 13, wherein the bus control module further includes a second power source output interface coupled with a slave module.

15. The intelligent connector according to claim 1, wherein the bus interface is a single-wire bus interface.

16. The intelligent connector according to claim 15, wherein the bus interface is a Local Interconnect Network bus interface.

17. The intelligent connector according to claim 16, wherein the bus interface includes a one voltage input pin, a ground pin and a data pin.

18. The intelligent connector according to claim 1, wherein the bus control module further includes a debug interface.

19. The intelligent connector according to claim 1, wherein the load interface includes a frequency signal pin, a voltage analog signal pin, a PWM signal pin, a switch signal pin or a controllable power source pin.

20. An intelligent connector, comprising:
   a bus control module having:
      a bus interface;
      a load interface;
      a first switch control interface configured to output a switch control signal;
      a signal processing unit configured to process a interchanged signal;
      a first power source input interface corresponding with a power supply line to receive a power supply; and
      a first power source output interface; and
   a power source control module connected with the bus control module and including a power source input interface, the first power source output interface detachably coupled with the power source input interface of the power source control module to output the power supply received from the first power source input interface.

21. The intelligent connector according to claim 20, wherein the power source control module includes a power source output interface.

22. The intelligent connector according to claim 21, wherein the bus control module further includes a second power source input interface connected with the power source output interface to receive the power supply.

23. The intelligent connector according to claim 22, wherein the bus control module further includes a second power source output interface coupled with a slave module.

* * * * *